March 18, 1958   G. L. HILDEBRAND   2,826,918
METHOD OF BALANCING IMMERSIBLE BODIES
Filed Feb. 1, 1956

Inventor:
George L. Hildebrand
by, Richard E. Hasley
His Attorney

2,826,918

METHOD OF BALANCING IMMERSIBLE BODIES

George L. Hildebrand, Marblehead, Mass., assignor to General Electric Company, a corporation of New York Application February 1, 1956, Serial No. 562,707

7 Claims. (Cl. 74—5)

This invention relates to the art of balancing immersed bodies and more particularly to an improved method of balancing by means of which an immersed body may be maintained in static equilibrium regardless of the density of the immersion fluid.

While the invention described herein is discussed in connection with the gyroscope art wherein it is particularly useful, it is obviously equally applicable to other fields where an immersed element must be balanced against rotational torques occasioned by an imbalance of gravitational and buoyant forces about a given axis or point.

The requirements imposed upon modern day gyroscopes necessitate the employment of massive gyro rotors to assure maximum gyroscopic inertia. But since it is important to minimize sources of gyroscopic errors such as bearing frictions and dormant locking torques transmitted to the rotor through the gimbal structure, it is conventional to utilize delicate precision bearings to support the gyro for movement about its axes of rotation. Because of the damage that might otherwise result under normal operating conditions by the imposition of heavy loads upon these bearings, the rotor structure and part of its support means are very often encased within a liquid-tight enclosure and suspended within a buoyant liquid. An attempt is made to equate the average mass of the enclosure and its contents to the mass of the fluid displaced, so that the entire weight of the rotor structure is borne by the force of buoyancy, substantially freeing some of the supporting bearings from much of the load.

It will, of course, be recognized that torques which may be exerted upon the gyroscope by reason of the center of gravity coinciding imperfectly with the center of buoyancy will tend to upset the gyroscope, destroying the very stability sought to be attained in the employment of such a device, and such torques cannot, therefore, be tolerated. It is, accordingly, conventional to approximate a balanced condition of the gyroscope by any of several known methods including the addition or removal of material or the movement of adjustable weights. It may be appreciated, however, that the rotor structure and its enclosure may be balanced against rotational torques arising in a fluid having a given density, and yet be unbalanced in another fluid of a different density. This is readily appreciated when it is realized that a change in density of a buoyant medium will vary the buoyant torque exerted on that body about a given axis, but leave unchanged the gravitational torque on that body about the same axis. If, then, a condition of equilibrium prevailed before the change of density, it is very likely that the state of balance will thereafter be destroyed.

In practice, it is found that a buoyant fluid used for supporting an enclosed gyro rotor structure may experience a wide range of densities under the widely varying temperature extremes in which a gyroscope is called upon to operate. Under these changing circumstances, since the buoyant force will vary, the enclosed rotor structure may tend to sink or to rise. Such a tendency is entirely tolerable provided, however, that no rotational torques are occasioned thereby. That is to say, so long as the center of buoyancy coincides with the center of gravity and both are situated upon the axis about which the enclosed rotor structure is free to rotate, a change in the density of the buoyant fluid will produce no torques on the immersed body.

This condition has in the past been approximated only by tedious and repetitive balancing operations. By the trial-and-error method of immersing the body to be balanced in a series of fluids having different densities and each time balancing that body by trimming or moving weights on that body, the condition of universal balance for fluids of all densities is approached only as a limiting condition.

It is, accordingly, an object of my inventoin to provide an improved balancing method by means of which an immersed body may be universally balanced against rotational torques with a minimum of operational steps.

Another object of this invention is to provide an improved method by which a static equilibrium may be imparted to a gyro rotor enclosure in a minimum number of steps leaving the rotor free to assume any angular attitude about its support axis.

Briefly stated, my invention may be practiced by providing a gyro rotor enclosure supported for rotation about a given axis with adjustable counterbalance weights having dissimilar densities. The enclosure is immersed in a fluid having a density equal to that of some of the weights and brought to a condition of equipoise by adjusting the weights which are unequal in density to the surrounding medium. Following this step, the density of the buoyant fluid is changed, for example, by heating it to another temperature. The enclosure is then rebalanced, but this time the previously unmoved balanced weights are adjusted to accomplish this purpose. By this uncomplicated procedure, it can be shown that the body will remain in a state of static or standing balance regardless of the change in density of the surrounding medium.

Although the scope of this invention is not to be limited, except by a fair interpretation of the appended claims, the details of the invention, as well as further objects and advantages may best be perceived in connection with the drawings annexed hereto in which:

Figure 1:
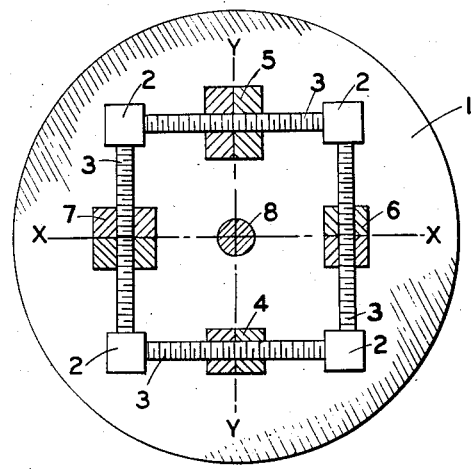
Figure 1 represents an end view of an immersible body provided with a system of balance weights particularly effective in practicing this invention.
Figure 2:
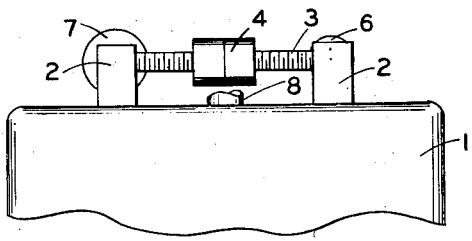
Figure 2 represents a side view of the details shown in Figure 1.

In Figures 1 and 2 may be seen a gyro rotor case 1 enclosing elements of the gyroscope for immersion in a buoyant fluid. On the exterior of the case, projections 2 provide mounting means for threaded elements 3. Adjustably movable along the threaded elements are counterbalance weights provided in two sets, weights 4 and 5 being for the purpose of adjusting torques arising on either side of the axis Y—Y, and weights 6 and 7 performing a similar function relative to axis X—X. The entire structure is mounted on shaft 8 for angular movement about the axis thereof. In order to introduce no additional imbalance into the system, weights 4, 5, 6 and 7 are similar in mass. Weights 4 and 6, however, are shown smaller and hence denser than weights 5 and 7.

In order to balance the rotor case so that it is free to assume any angular attitude about its shaft, it is first immersed in a buoyant fluid equal in density to weights 5 and 7. With balance weight 5 uppermost, weight 4 is moved along its threaded element until the rotor case is balanced against torques arising on either side of the vertical axis Y—Y. Thereafter the rotor enclosure is placed in a second fluid having a density appreciably different from that of the first. The same purpose could as easily be effected by heating the original fluid if the consequent change in density is of sufficient magnitude. Although the density of the first fluid must have been equal to at least one of the counterbalance weights, no such limitation is placed on the density of the second fluid.

With the rotor case immersed in the second fluid, balance weight 5 is then moved to a position at which equilibrium is again established. This operation will not disturb in the least the balance obtained in the first fluid, since in that fluid, counterbalance weight 5 was essentially weightless, the buoyant force exactly balancing the gravitational force acting thereon. Therefore, for both the first and second fluid densities the rotor case is obviously in balance on either side of axis Y—Y. That the rotor case is balanced for fluids of all other densities will be established below.

The steps outlined above accomplish the type of poise and equipoise desirable in a weighing instrument. That is, except in the entirely fortuitous circumstance wherein both the center of buoyancy and the center of gravity have been made to lie on the axis of rotation of the rotor case by the procedure described, the balanced condition achieved by the previously outlined steps will be one to which the rotor case will attempt to return if angularly displaced from that position.

In many applications of this invention, a stable state of this nature may be all that is necessary or desirable. In the gyroscope art, however, a static or standing balance is imperative; that is, the rotor case must be capable of assuming any given attitude with no tendency to return to a predetermined position. The instrument must be attended by a steady stability at any orientation about its axis of rotation. To achieve this condition by the practice of this invention, then, the rotor case should be rotated through ninety degrees so that counterbalance weight 7, for example, is uppermost and the procedure previously described should be repeated using weights 6 and 7 instead of 4 and 5. By this act, the X and Y axes are interchanged in position and equilibrium is established about the X—X axis.

Figure 3:
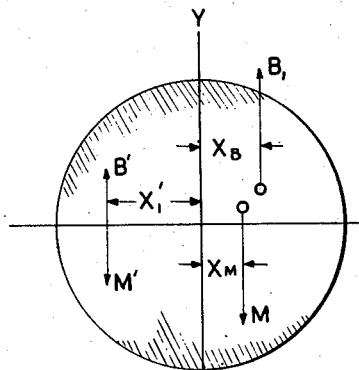
Figure 3 is a schematic representation of the forces acting on a body immersed in a fluid having a given density.
Figure 4:
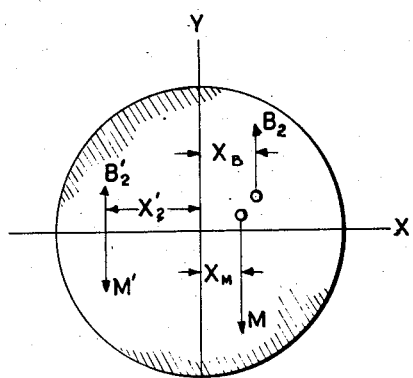
Figure 4 is a schematic representation similar to Figure 3 of forces arising in a fluid of different density.

Reference may be had to Figures 3 and 4 to show that a body balanced by the preceding method will remain balanced regardless of the change in density of the buoyant medium. Figure 3 represents the rotor case and the forces acting thereon when immersed in the first fluid (density=$d_1$) and balanced by any suitable adjustment. Let $M'$=the gravitational force on the weight whose density is $d_1$ and $M$=the gravitational force on the rotor case and all its attachments except balance weight $M'$
$B_1'$=the buoyant force exerted on weight $M'$
$B_1$=the buoyant force exerted on the rest of the structure If we arbitrarily select the intersection of the X and Y axes as the axis to be balanced about, then $x_1'$, $x_B$ and $x_M$ represent the lever arms of the various buoyant and gravitational forces about the Z axis. Assuming, then, that clockwise torques are positive, the sum of the torques at balanced condition may be represented, thus:

$$T_1 = B_1' x_1' - M' x_1' - B_1 x_B + M x_M = 0 \quad (1)$$

But since our original condition was that $B_1'$ and $M'$ are equal, $$M x_M - B_1 x_B = 0 \quad (2)$$

Now the buoyant force is equal to the volume of fluid displaced times the density of the fluid, where density is expressed in terms of weight, not mass, per unit volume.

*Proof*

Hence, $$B_1 x_B = M x_M = V d_1 x_B \quad (3)$$

similarly, $$M' = V' d_1 \quad (4)$$

Turning now to Figure 4 which represents the rotor case and the forces acting upon it when immersed in the second fluid (density=$d_2$), after balancing by moving the weight $M'$ along the X axis, an equation similar to Equation 1 may be formulated, $$T_2 = B_2' x_2' - M' x_2' - B_2 x_B + M x_M = 0 \quad (5)$$

If Equation 5 is rewritten in terms of volume and density, $$V' d_2 x_2' - V' d_1 x_2' - V d_2 x_B + V d_1 x_B = 0 \quad (6)$$

Factored, Equation 6 becomes, $$V' x_2'(d_2 - d_1) - V x_B(d_2 - d_1) = 0$$
$$(V' x_2' - V x_B)(d_2 - d_1) = 0 \quad (7)$$

but since $(d_2 - d_1)$ cannot be equal to zero, $$V' x_2' - V x_B = 0 \quad (8)$$

From Equations 3 and 4, $$\frac{M' x_2'}{d_1} - \frac{M x_M}{d_1} = 0$$

or, $$M' x_2' - M x_M = 0 \quad (9)$$

That is to say, when the balance weight $M'$ occupies the position achieved after the second balance operation, the system will remain in equilibrium regardless of the density of the buoyant fluid.

The preceding proof assumed that the dimensions of the rotor case remained constant under all conditions. To avoid an imbalance resulting from dimensional instability caused by temperature changes, the object to be balanced should either be made of one material or should be symmetrical about the axis of rotation. In practice an object to be balanced is usually designed symmetrically. A further refinement can be made by specifying materials for the counterbalance weights which change in volume with temperature by the same function as does the immersed body.

It should be noted that the objects and advantages of this invention are secured by having the density of the first fluid used equal to the density of the counterbalance weights which are moved on the second balancing operation. Should the operations be reversed, and the first balancing step be performed in a medium whose density is dissimilar from that of any of the counterbalance weights, it would not then be possible to complete the procedure in one additional step, except by pure chance. Instead, it would be necessary thereafter to repeat the steps in the order previously outlined. In such an event one of the steps, the first one, would have been unnecessary.

Certain changes in the order and performance of these steps may, however, be made within the scope of these teachings. For example, although it is preferred for ease of adjustment to have counterbalance weights of two different densities, both types are not required. If only one type of counterbalance weight is employed having the density of the first buoyant fluid, the first balancing operation may be conducted, for example, by adding to or removing bits of material from the rotor case. In the case where a standing balance is desired requiring balancing operations to be conducted about both the X and the Y axes, instead of completing the balancing operation about one axis before initiating the same operation about the other axis, the procedure may be varied by balancing about both the X and the Y axes while the rotor case is immersed in the first fluid, and, when the case is placed in the second fluid, rebalancing about both axes. It may thus be seen that the above detailed steps are illustrative and not limiting in nature. Various changes in the balancing operation may therefore be made within the scope of the invention in its broader aspects.

What I claim as new and desire to secure by Letters Patent of the United States is:

1. The method of balancing a body against gravitational and buoyant torques about a given axis regardless of the density of the fluid in which it may be suspended comprising the steps of balancing the body against rotational torques resultant from an imbalance of buoyant and gravitational torques about said axis while said body is immersed in a medium having a first density, and thereafter adjusting the balance of said body about said axis by means of at least one element having said first density while said body is immersed in a fluid having a second density dissimilar from said first density.

2. The method of balancing a body against gravitational and buoyant torques about a given axis regardless of the density of the fluid medium in which it may be suspended comprising the steps of providing the body with at least one adjustably movable balance weight of a given density, immersing said body in a fluid medium having a first density equal to that of said balance weight, balancing said body against rotational torques resultant from an unbalance of buoyant and gravitational torques about said axis while said body is immersed in the medium having said first density, immersing said body in a fluid medium having a second density dissimilar from that of said first density, and while said body is immersed in the medium having said second density adjustably moving said balance weight until said body is balanced against rotational torques about said axis resultant from an unbalance of buoyant and gravitational torques.

3. The method of balancing a body against rotational gravitational and buoyant torques about a given axis when immersed in a fluid of any fixed or variable density comprising the following steps: providing the body with first and second weights having dissimilar densities, said weights being individually and adjustably movable in a direction including at least a component of a direction perpendicular to said axis, immersing said body and adjustable weights in a fluid having a density equal to that of said first weight, adjustably moving said second weight until said body is balanced about said given axis, placing said body in a fluid having a density dissimilar to that of said first weight, adjustably moving said first weight until said body is balanced about said given axis.

4. The method of balancing a body against gravitational and buoyant torques about a given axis regardless of the density of the fluid in which it may be suspended comprising the steps of providing the body with one or more adjustably movable balance weights of a given density, balancing said body against rotational torques resulting from an unbalance of buoyant and gravitational torques while said body is immersed in a fluid medium having a density equal to that of said balance weight and then adjustably moving said balance weight while said body is immersed in a fluid medium having a density dissimilar from that of said weight until said body is balanced against rotational torques resultant from an unbalance of buoyant and gravitational torques.

5. The method of balancing a body against gravitational and buoyant torques about a given axis comprising the following steps: providing said body with at least one adjustably movable balance weight of a given density, immersing said body in a first medium of a density equal to that of said balance weight, balancing said body against rotational torques resultant from an imbalance of buoyant and gravitational torques, immersing said body in a second medium having a density dissimilar from that of said first medium, and adjustably moving said balance weight until said body is balanced against rotational torques resultant from an imbalance of buoyant and gravitational torques.

6. The method of balancing an immersible gyro rotor case against gravitational and buoyant torques about an axis of rotation regardless of the density of the fluid in which it may be suspended comprising the steps of balancing the case against rotational torques resultant from an imbalance of buoyant and gravitational torques about said axis while said case is immersed in a medium having a first density, and thereafter adjusting the balance of said case about said axis by means of elements having said first density while said body is immersed in a fluid having a second density dissimilar from said first density.

7. The method of balancing an immersible gyro rotor case having an axis of support against rotational gravitational and buoyant torques about said axis when immersed in a fluid of any fixed or variable density comprising the following steps: providing the case with first and second weights having dissimilar densities, said weights being individually and adjustably movable in a direction including at least a component of a direction perpendicular to said axis; immersing said case and adjustable weights in a fluid having a density equal to that of said first weight; adjustably moving said second weight until said case is balanced about said given axis while said case is so immersed; immersing said case in a fluid having a density dissimilar from that of said first weight, and adjustably moving said first weight while said case is so immersed until said case is balanced about said axis.

References Cited in the file of this patent

UNITED STATES PATENTS

| | | |
|---|---|---|
| 1,180,815 | Anschutz-Kaempfe | Apr. 25, 1916 |
| 2,618,159 | Johnson et al. | Nov. 18, 1952 |
| 2,650,502 | Lundberg et al. | Sept. 1, 1953 |